United States Patent [19]

Sechrist

[11] Patent Number: 5,762,888
[45] Date of Patent: Jun. 9, 1998

[54] PROCESS AND APPARATUS FOR DISCHARGING PARTICLES AND FLUID FROM A FLOW CHANNEL

[75] Inventor: Paul A. Sechrist, Des Plaines, Ill.

[73] Assignee: UOP, Des Plaines, Ill.

[21] Appl. No.: 696,778

[22] Filed: Aug. 13, 1996

Related U.S. Application Data

[63] Continuation-in-part of Ser. No. 345,058, Nov. 25, 1994, Pat. No. 5,545,382.
[51] Int. Cl.⁶ ........................................................... B01J 8/12
[52] U.S. Cl. ........................... 422/216; 422/213; 208/152; 208/166; 261/113; 261/114.1
[58] Field of Search .............................. 422/213, 216; 208/152, 166; 261/113, 114.1

[56] References Cited

U.S. PATENT DOCUMENTS

| | | | |
|---|---|---|---|
| 3,883,312 | 5/1975 | Youngman | 23/288 |
| 4,357,304 | 11/1982 | Pegels et al. | 422/191 |
| 4,540,547 | 9/1985 | Schuurman | 422/49 |
| 4,568,523 | 2/1986 | Wijffels et al. | 422/191 |
| 4,590,045 | 5/1986 | Van der Wal et al. | 422/216 |
| 4,975,036 | 12/1990 | Jagannathan | 422/216 |

*Primary Examiner*—Timothy McMahon
*Attorney, Agent, or Firm*—Thomas K. McBride; John G. Tolomei

[57] ABSTRACT

A vessel arrangement and process for contacting a fluid reactant with a particulate catalyst in a plurality of flow channels and discharging fluid and particles from the flow channels. The particles are discharged axially from the bottom of the flow channels into an unconfined bed of particles. Fluid is discharged in a transverse direction through the sides of the flow channels and across screen openings located a short distance above the channel outlets. A plurality of chambers, additional particulate material or baffles regulate fluid flow through sections of the screens and prevent excessive fluid velocity in any section from holding up particle flow through the flow channels. The reactor arrangement and process of this invention is a particularly useful for arrangements that may be used to operate a reactor under isothermal or other controlled temperature conditions where a heat transfer fluid surrounds a plurality of tubular conduits or multiple flow channels that confine the particles and fluid.

19 Claims, 5 Drawing Sheets

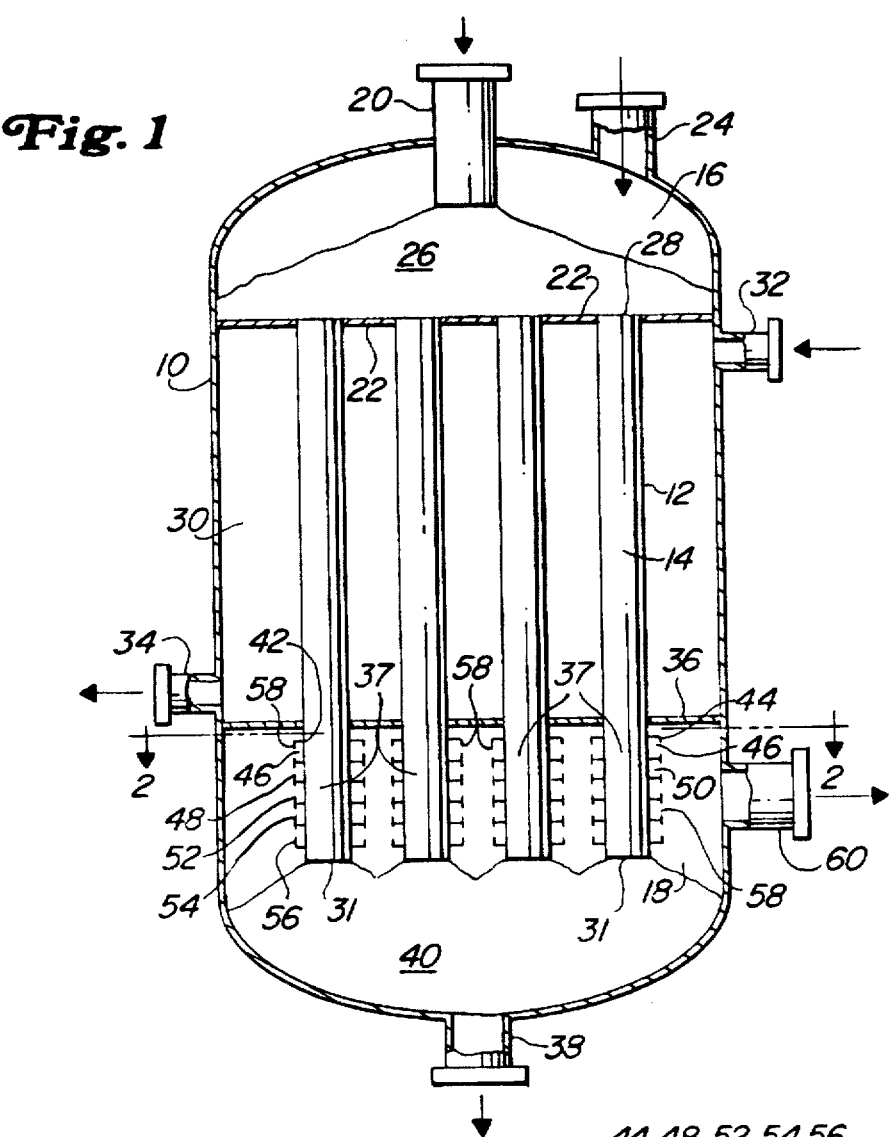

PROCESS AND APPARATUS FOR DISCHARGING PARTICLES AND FLUID FROM A FLOW CHANNEL

CROSS REFERENCE TO RELATED APPLICATION

This application is a continuation-in-part of U.S. Ser. No. 345,058, filed Nov. 25, 1994, and now allowed U.S. Pat. No. 5,545,382.

FIELD OF THE INVENTION

This invention relates to reactors for the conversion of a reaction fluid by contact with solid particles and the separation of the particles from the fluid after contacting.

BACKGROUND OF THE INVENTION

Systems for contacting solids and particulate material are well known and routinely employed in the processing of gases, the production of chemicals, and the refining of petroleum. The particulate materials in most cases comprise catalysts or adsorbents, and the process streams are gaseous or liquid mixtures of reactants, products, or streams undergoing separation.

One particularly well known method of contacting particulate material with a fluid stream retains the particulate solid material as a bed of particulate material through which the fluid stream passes. Long known advances in the methods and apparatus for contacting particulate materials with gaseous streams have employed means for moving the particulate material while the processing of the gaseous fluid is underway. A particular form of this system moves the particulate material through a contacting zone in plug flow. Individual particles rest on each other to make up the bed of particles as opposed to fluidized processes in which an upward flow of gaseous material lifts the particles to permit fluidized transport of particles through the bed of solids. Systems intermittently or continually moving particles in a plug flow bed greatly advanced the art of reactant and particle contacting by eliminating the need to shut down process equipment in order to change out particles after they have ceased to function due to deactivation or saturation.

A multitude of arrangements with various bed geometries are known for contacting the particulate material with the fluid streams. Such arrangements include radial flow beds where particulate solids are retained in an annular ring or in downflow or upflow beds where fluid streams pass through a cylindrical bed or laminar bed of particulate solids. This invention is directed to an arrangement wherein the particulate solids are retained in relatively narrow vertically extended flow channels through which the particulate solids and fluids move in a cocurrent direction. This arrangement is formed by using thin plate members to define flow channels or catalyst retaining tubes having the catalyst on the inside of the tubes. The use of plates or tubes to define flow channels is particularly important in applications that require or benefit from heating or cooling of the particulate solids and fluids within the flow channels to control the temperature of a reaction or other processing. In such arrangements, the thin plates or tubes provide a large area of heat transfer surface by which a heat transfer fluid may indirectly contact one surface of the tube or plate while the other surface retains the particulate solids and fluids. For example, concurrent indirect heat transfer in which a reactant fluid contacts a catalyst and reaction fluid can be used to supply or withdraw the heat of reaction in an endothermic or exothermic process to establish isothermal conditions in the reaction zone.

While such systems controlling temperature are known, simultaneous movement of particulate solids during the reaction and heat transfer requires the recovery of the particulate material from a large number of flow channels or tubes within a contacting vessel. Simultaneous recovery of the fluid stream from the flow channels must occur with the recovery of particulate material. The simplest method for collecting the particulate material and for recovering the fluid stream is to discharge them into an open volume or chamber at the bottom of the flow channels while also discharging the fluid stream to the same chamber of collection area.

It has been found that under some conditions the discharge of the fluid stream along with the particles into a common collection chamber can cause a phenomena generally referred to as "blow out." "Blow out" out refers to the fluid stream causing fluidization of the particulate material at the outlet of the flow channel. The occurrence of blow out is related to the mass flux of the fluid stream passing through the particulate material in the conduit. As the mass flux increases, it increases the frictional drag force on the particulate material which increases the pressure tending to discharge the particulate material from the flow channel. Thus the mass flux of fluid through the particulate material can be maintained until a critical pressure gradient is reached at which point all of the particulate material is rapidly discharged from the conduit. The resulting relatively empty conduit then provides an unrestricted flow path for a large volume of the fluid stream to by-pass the particulate material in the other conduits. Blow out may also occur when the vertically upward flow of fluid locally around the discharge end of the conduit reaches a velocity where it fluidizes the solids in which the outlet of a flow channel is buried. Once the particles around the outlet reach fluidization, particles flow freely away from the flow channel outlet and remove all resistance to the downward pressure on the particles within the flow channel, and again, the flow channel rapidly empties.

There are known methods for preventing blow out which include providing a restriction at the bottom of the flow channel outlets. While such devices will raise the pressure gradient required from the fluid stream before blow out is reached, blow out will still eventually occur with sufficient mass flux and gradient through the conduit. Thus consideration of blow out will still impose a limitation on gas flux through the flow channels.

It is known from U.S. Pat. No. 4,975,036 to disengage gaseous fluids from particulate material upstream of the outlet end of a conduit from which particulate material is discharged. This type of system incorporates a cylindrical screen section into a cylindrical conduit for transporting catalyst particles. The screen section is located well upstream of the conduit outlet and is sized to prevent passage of the catalyst particles through the screen members while permitting the escape of gases therethrough. The systems shown herein transfer the catalyst particles through extended conduits in dense phase and collect the particles in a confined conduit arrangement. Confinement of the particles prevents blow out from occurring but limits the number or complicates the arrangement of the flow channels.

Moreover, the radial discharge of fluid streams from conduits carrying particulate material are subject to another phenomena generally referred to as pinning. As the gas velocity increases, it reaches a point where the frictional forces generated by the gas passing across the particulate solids overcome the weight of gravity acting downward on the solids and hold the particulate material against the screen thereby restricting the flow of particulate material downwardly through the flow channel or conduit. In relatively small diameter conduits, those having a diameter of six inches or less, even small amounts of pinning can quickly block all movement of particulate material down the flow channel.

As with U.S. Pat. No. 4,975,036, U.S. Pat. Nos. 3,883,313, 4,357,304 and 4,568,523 also disclose methods and apparatus for disengaging fluid from a particulate solid. However, none of the cited patents address the problem of localized pinning of the particulate materials by the discharge of gas from the particulate material.

BRIEF SUMMARY OF THE INVENTION

This invention overcomes the dual problems of blow out and pinning with an arrangement that regulates the disengagement of fluid from a column of particulate material to effect disengagement without causing pinning. The restricted disengagement of the fluid from the solid particles takes place above the primary outlet by which the particles exit the flow channel. An important element of this invention is the arrangement of the fluid disengagement section. The fluid disengagement area retains the particulate material with a fluid permeable member such as a screen. The fluid permeable member has an extended vertical length and a large open flow area. Downstream regulation of fluid flow exiting the gas permeable member prevents localized high fluid velocities near the top of the fluid permeable member that could cause pinning. To be effective the downstream regulation permits adjustment of the flow restriction imposed on fluid that exits the permeable member at different elevations. The regulation may segregate the disengaged fluid from different elevations of the fluid permeable member into different stages and control the velocity of fluid flow exiting each stage. Control of the fluid velocity from each stage can be done by sizing orifice openings to restrict gas flow from distinct regulation chambers or with separate valves from each chamber that permit on stream adjustment of the fluid flow from each stage. Controlling the flow of fluid out of each stage limits the velocity of the fluid as it exits through the fluid permeable member and keeps the fluid velocity from reaching a level that will result in pinning of the particulate solids. Providing the fluid regulation downstream of the fluid permeable member eliminates high pressure drops at the fluid permeable member that could cause localized pinning and imposes the pressure drop in the presence of fluid alone. The extended length of distribution over the fluid permeable member allows the flow channels to handle high fluid mass fluxes without either pinning or blow out occurring.

In addition to segregation of the exiting fluid flow into different stages, there are many ways to provide suitable regulation of the fluid flow downstream of the fluid permeable member. For example, a layer of particulate material may be positioned on the downstream side of the fluid permeable member and retained in a manner that only permits fluid to exit a lower portion of the particle layer. In this manner as fluid exits higher elevations of the fluid permeable member, it encounters an increasing resistance to flow that constantly increases the pressure drop. A steadily increasing pressure drop may also be achieved by using a baffle positioned downstream of the fluid permeable member. Spacing between the baffle and gas permeable member can be increased down the length of the fluid permeable member to give progressively less resistance to fluid flow down the length of the fluid permeable member.

Accordingly, in an apparatus embodiment, this invention is an apparatus for contacting a fluid stream with particulate solids and disengaging the fluid stream from the particles. The apparatus includes a partition at least partially defining a flow channel inlet defined, at least in part, by the partition at an upper end of the flow channel for receiving a fluid flow and a flow channel outlet defined, at least in part, by the partition at a lower end of the flow channel. A disengagement chamber defined by a vertically extended and fluid permeable sidewall communicates with the flow channel outlet for receiving particulate material and the flow of fluid. A flow restrictor is arranged to restrict the flow of fluid out of an upper portion of the sidewall relative to a lower portion of the sidewall.

In a more limited embodiment, this invention is an apparatus for contacting a fluid stream with particulate solids that comprises a first plurality of partitions defining a plurality of flow channels, a flow channel inlet at an upper end of each of the flow channels, and a flow channel outlet at a lower end of each of the flow channels. A second plurality of partitions define a plurality of vertically extended disengagement channels, a plurality of disengagement channel inlets in communication with the flow channel outlets, and a plurality of disengaging channel outlets for discharging particulate material. The second plurality of partitions have fluid permeable sidewalls for discharging fluid laterally from the channels. A fluid flow regulator in closed communication with the fluid permeable side walls restricts fluid flow across the side walls to a velocity that is less than the velocity that will cause the particulate material to pin along the sidewalls.

In an alternate embodiment, this invention is a method of separating fluids from particulate solids in a process for contacting the fluid stream with particulate solids. The method retains particulate solids in a vertical flow channel and at least periodically withdraws particulate material from a first particle outlet of the flow channel. A process fluid passes through the flow channel. A first particle outlet discharges process fluid. Discharged process fluid and particulate material from the outlet pass to a disengaging channel. A second particle outlet at least periodically discharges particulate material from the disengaging channel. A fluid permeable portion of the disengaging channel discharges at least a portion of the process fluid from the channel upstream of the second particle outlet. Restriction of the flow of process fluid out of the fluid permeable portion maintains a velocity through the screens that is less than the velocity that will cause the pinning of particulate solids against the fluid permeable portion.

This invention can be practiced with a variety of different flow channel arrangements and chamber arrangements. The following description describes a limited number of alternative arrangements for the apparatus and the method of this invention. Those skilled in the art will be aware of other arrangements that can be employed using the broad principals of this invention from the additional details and descriptions that follow.

BRIEF DESCRIPTION OF THE DRAWINGS

FIG. 1 is a vertical elevation showing a cross-section and the internals of a flow channel and baffle arrangement of this invention.

FIG. 2 is a cross-section of FIG. 1 taken at section 2—2.

DETAILED DESCRIPTION OF THE INVENTION

Figure 3:
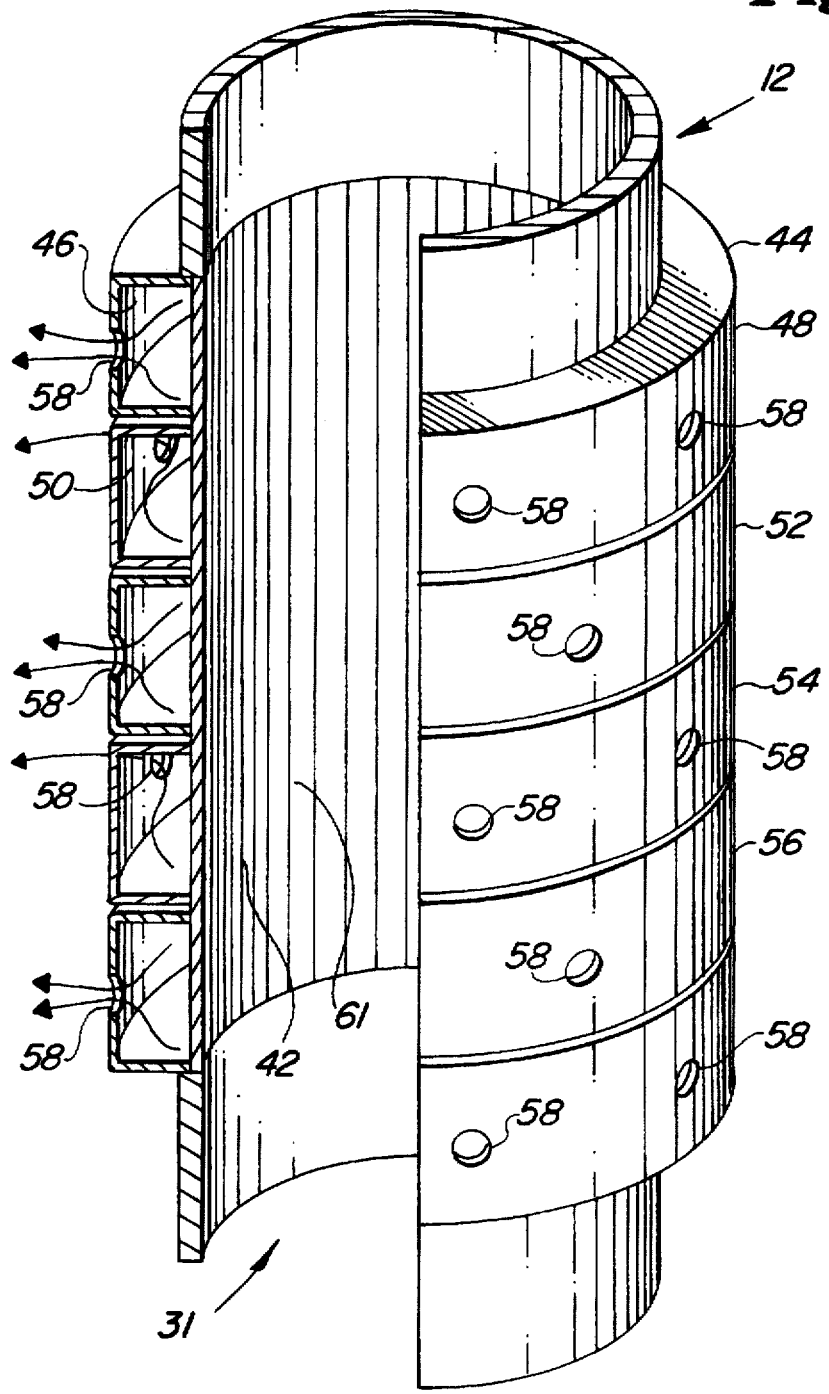
FIG. 3 is an isometric view showing the bottom of a tubular conduit from FIG. 1 in partial cross-section.

This invention applies to arrangements for contacting particulate material with fluids. This type of contacting maintains the particulate solids in a plurality of dense compact beds. The particulate solids may be any material that will maintain its shape under the specific conditions of contacting that take place within the flow channels through which the solid particles pass. The particulate material is not generally limited in size but will, in most cases, have a nominal diameter of ¼ inch or less. Particularly preferred particles will have a relatively uniform size.

A fluid stream contacts the solid particulate material that is retained in the channels. The fluid is preferably in gaseous phase. Additional fluid streams may be employed to effect indirect heat exchange with the partitions that form the catalyst retaining flow channels. Specific hydrocarbon conversion processes that may benefit from temperature control are: catalytic dehydrogenation of paraffins, reforming of naphtha feedstreams, aromatization of light hydrocarbons, and the alkylation of aromatic hydrocarbons. This invention is further described in the context of the figures which show the preferred form of the invention as a reactor arrangement for contacting catalyst particles with a gaseous phase reactant stream.

Looking at FIG. 1, a reactor vessel 10 houses a plurality of tubes 12 that serve as partitions to define flow channels 14. Flow channels 14 have a circular cross-section. Above the tubes 12, reactor 10 encloses a chamber 16 for the distribution of solid particles in the form of catalyst to the tubes and the addition of gaseous reactants for passage through the catalyst in flow channels 14. The catalyst passes through a nozzle 20 and rests in chamber 16 on a transversely extended partition 22. Reactants pass into chamber 16 through a nozzle 24 and pass through the bed of catalyst 26. Catalyst bed 26 retains an inventory of catalyst particles that maintains a constant supply of catalyst to the tubes 14. As catalyst is withdrawn from the bottom of the reactor 10 through a catalyst withdrawal nozzle 38 catalyst particles pass from bed 26 into channels 14 primarily under gravity flow with some assistance of gases at the inlet of the tubes.

Chamber 16 distributes both catalyst and reactants into the flow channels 14 of the reactor vessel. Tubes 14 each define an inlet 28 at partition plate 22. The inlets receive both catalyst and a gaseous reactant from chamber 16. Inlets 28 feed the catalyst particles and reactants into the vertically extended flow channels 14.

The middle of the reactor defines a heat exchange chamber 30. Heat exchange chamber 30 surrounds the exterior of tubes 12. The surrounded portion of tubes 12 provide a heat transfer surface for the heating or cooling of the catalyst and reactants in flow channels 14. Heat exchange medium enters the chamber 30 through a nozzle 32 and exits the chamber 30 through a nozzle 34. Another transversely extended partition 36 defines the bottom of the heat exchange chamber 30 and separates the heat exchange portion of tubes 12 from the lower portion of tubes 12.

The bottom of the reactor vessel forms a collection chamber 18. Tubes 12 extend below partition 36 into collection chamber 18. Collection chamber 18 contains a plurality of tubes. Each tube 12 defines an outlet 31 at its lower most portion. The outlets 31 all discharge catalyst particles at a common elevation. Discharged catalyst collects in a bed 40. The direct discharge of outlets 31 into the open collection chamber 18 provide a compact design that minimizes the necessary height of the chamber from outlets 31 to catalyst nozzle 38. As catalyst exits tubes 12 through outlets 31, it maintains bed 40 as a dense bed up to the top of outlet 31. The dense bed of catalyst up to outlets 31 maintains flow channels 14 full of catalyst over their entire length.

The lower portion of each of tubes 12 provides a disengagement chamber 37. The outlet for the upper portion of each of tubes 12 is at the level of partition 36. The upper portion of each tube 12 discharges particles and gas into the disengagement chambers 37.

In the practice of this invention, the discharge of the gaseous reactants occurs, at least in part, from disengagement chamber 37 through the sides of tubes 12. In the outlet portion located below partition 36, each tube 12 has a perforated portion 42 that provides a fluid permeable sidewall. Perforated portion 42 usually comprises a screen member. At least two chambers for receiving the reactant fluid surround each perforated portion 42. An upper baffle 44 in the form of a U-shaped channel member encircles the exterior wall of tube 12 and forms an upper chamber 46 for regulating the fluid flow out of an upper section of the perforated portion 42. Directly below chamber 46 another U-shaped channel member baffle 48 surrounds another section of the perforated portion 42 to enclose another chamber 50. The remaining portion of the perforated section of conduit 12 has additional U-shaped channel shaped members providing baffles 52, 54, and 56 that surround the tubes and define chambers. Preferably the flow channels extend only a short distance from where the perforated section stops to the end of the channel at outlet 31. The length of channel above the outlets 31 and below the perforated section is preferably less than five flow channel diameters from the outlet 31 and, more preferably, in a range of from 2–3 flow channel diameters. Typically, the vertical length of the perforated section 42 surrounded by baffles will exceed the length of flow channel 14 between outlet 31 and the bottom of the perforated section 42. The perforated section 42, the chambers surrounding the perforated section and orifice openings 58 defined in the sides of the flow channels comprise a flow restrictor that provides means for regulating the flow of reactants out of the individual chambers associated with each flow channel. Reaction gases from the orifice openings 58 as well as any gases that pass outwardly through outlet 31 enter collection chamber 18 and exit through a product outlet nozzle 60.

FIG. 2 shows the arrangement of multiple tubes 12 for reactor 10 at the outlet portion of the tubes across the perforated portions 42. The baffles 44, 48, 52, 54, and 56 surround the entire periphery of the perforated portions 42. Orifice openings 58 are evenly distributed around the circumference of each baffle to restrict reactant flow across the perforated portion. The restriction of flow through each perforated portion by orifices 58 prevents the gas velocity across the perforated portion from approaching that which would cause pinning of the catalyst particles against the openings of the perforated portion. Preferably, the orifice openings 58 have a flow area that will permit a maximum gas flow that is not high enough to cause pinning across the perforated portion.

As shown in FIG. 3, the perforated portion ordinaly consists of a screen in the form of profile wire 61 that defines spaces between the wires and permits gas to flow out of the tubes 12 but retains the particles inside. U-shaped baffles 44, 48, etc., are welded directly to the screen of perforated section 42. The screen sections are sealed between baffle sections by welding of the U-shaped baffles to the screen.

Each chamber 44, 48, etc., is limited in the amount of reactant flow permitted to flow therethrough by the pressure drop through restriction orifices 58. Restriction orifices 58 thereby create a total flow area across screen 42 into each baffle that greatly exceeds the flow area of the restriction orifices defined by that baffle. It is preferred in the practice of this invention that the majority of the reactant gas exit tubes 12 laterally through the screen 42 of the flow channels instead of the outlet 31. By using two or more chambers separated by baffles, the total reactant gas velocity across the screen section 42 is kept relatively low, typically in a range of from 0.1 to 1.0 ft/sec which is well below the normal pinning velocity which is typically in a range of from 1.0 to 5.0 ft/sec. Orifices 58 are also sized slightly smaller than that needed to keep the gas velocity across perforated portion 42 below that which will cause pinning. The velocity that will cause pinning is effected by the downward gas velocity through the tube or chamber. A velocity greater than that which would cause pinning may take the downward gas velocity into account since the downward component of force exerted by the gas through the catalyst particles assists gravity flow by pushing the catalyst particles downward and raises the gas velocity necessary to cause pinning. The addition of extra baffles provide additional stages of reaction gas regulation that can reduce total pressure drop and the resulting gas velocity across any given screen section may be kept in any range that will provide a suitable factor of safety against pinning.

Figure 4:
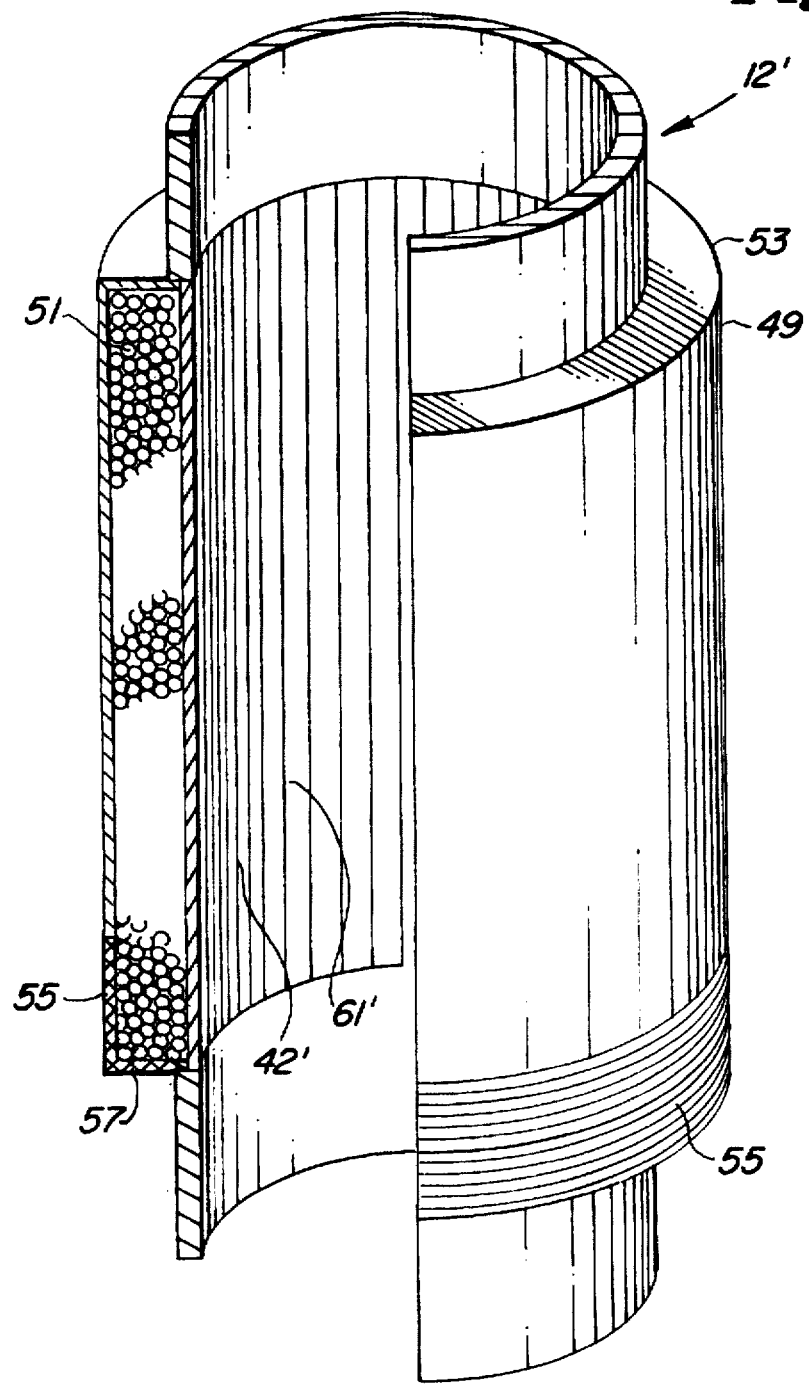
FIG. 4 is an isometric view showing an alternate embodiment for the bottom of the tubular conduit shown in FIG. 3.

The necessary flow restriction to prevent pinning can be provided in a variety of ways. FIG. 4 shows a modified tube end 12' that has a sleeve 49 for retaining a layer of particulate material 51 against a screen section 42' formed of profile wire 61'. The particulate material can be any material that will permit fluid flow, but impose an increasing pressure drop with increased fluid flow path. Inert materials such as ceramic balls are the preferred particulate material for layer 51. The size of the particulate material may be adjusted as desired to increase the pressure drop. The top 53 and the majority of the side of sleeve 49 is fluid impermeable. Disengaged fluid from the interior of tube end 12' flows across screen 42' and out of particulate material 51 through a cylindrical screen section 55 and an annular screen section 57 located at the bottom of sleeve 49. Fluid disengaged from tube 12' through an upper portion of screen 42'has a longer flow path through particulate material 51 than fluid disengaged through a lower portion of screen 42'. Since the interior of tube 12' is usually filled with particulate material, fluid crossing any portion of screen 42' will have an essentially uniform flow length through the particulate material. This uniform flow length will create an essentially uniform fluid flow across screen 42.'

Figure 5:
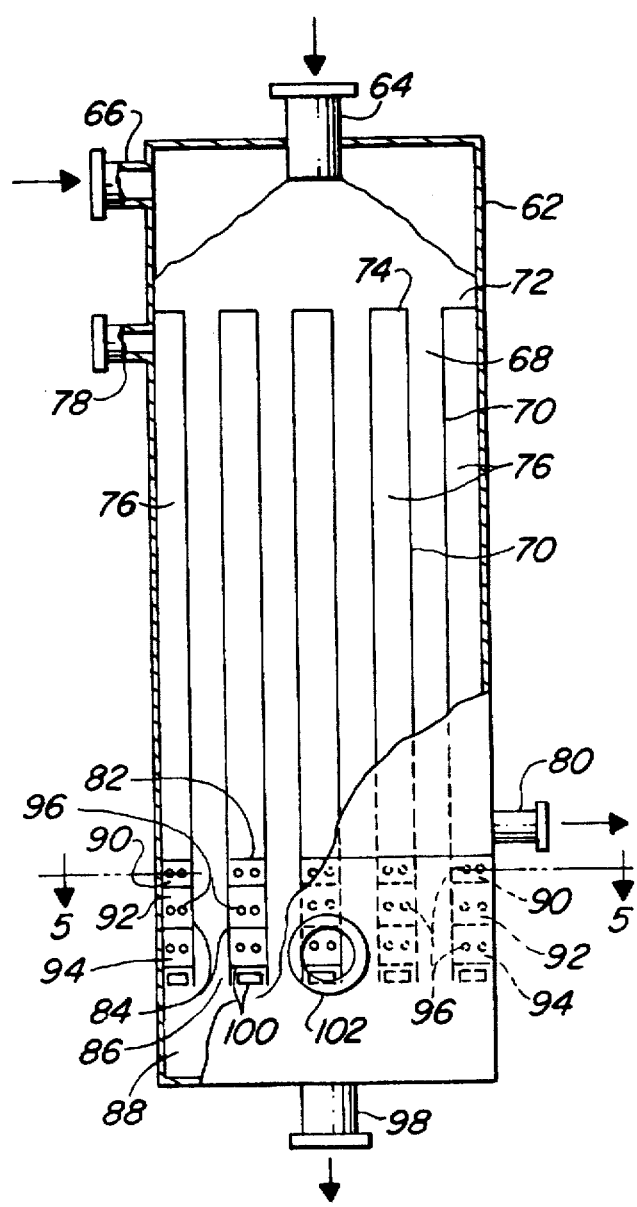
FIG. 5 is an elevation view of an alternative flow channel and vessel arrangement of this invention showing a partial cross-section.

The flow channels and baffles may be arranged in other configurations that still permit a compact arrangement for discharging particles from the ends of the flow channels while avoiding the problems of blow out or pinning. FIG. 5 shows an arrangement that uses vertically oriented plates 70 to define rectangular flow channels 68 in a vessel 62 having a box configuration. Particles enter the top of vessel 62 by a nozzle 64 for gravity transport therethrough. Gas enters the top of reactor 62 through a nozzle 66. Particles and gas flow into the flow channel 68 defined by plates 70. Plates 70 together with a transverse partition 72 define inlets 74 for the particles and gas to enter flow channel 68.

Plates 70 are preferably thin plates that permit rapid heat transfer between heat transfer channel 76 and the catalyst and gas flow channel 68. The plates may be shaped to enhance heat transfer. For example, the plates may be corrugated and arranged with alternating diagonal corrugation patterns to form flow channels.

The heat transfer fluid enters the channel 76 through a nozzle 78 and passes from channel to channel through a distribution chamber at the front and the back of the reactor (not shown). The heat transfer fluid exits the chamber 76 through distribution flow channels (not shown) and a nozzle 80. Transversely extending baffles 82 divide the flow channel 68 into an upper heat transfer portion and a lower gas outlet portion. While FIG. 5 shows the plates 70 forming continuous partitions that extend from the heat transfer portion of the gas outlet portion, separate partitions may be used in each portion. When defining the channels in the upper and lower portion with separate partitions, it may be desirable to vary the orientation of the channels from one section to the next such that the partitions define channels in the lower section that are perpendicular with respect to the channels in the upper section.

In the gas outlet portion gas is discharged laterally across perforated sections 84 of the plates 70. The particles and the remainder of any gas are discharged downwardly through an outlet 86, defined by the bottom of plate 70, into a particle bed 88. The perforated portions 84 disengage gases laterally into gas collection chambers 90, 92, and 94. The quantity of gas flowing out of each gas collection chamber is regulated by orifice openings 96. The collected particles exit the bottom of vessel 62 through a nozzle 98. Gases that pass through outlets 86 disengage from the particles and pass through ports 100 where they are joined with gases from orifice openings 96 for withdrawal from the vessel through outlet 102.

Figure 6:
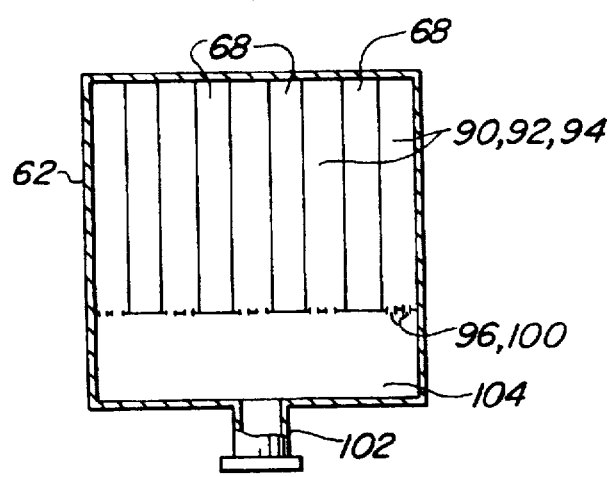
FIG. 6 is a cross-section of the arrangement shown in FIG. 4 taken at section 5—5.

Gases from orifice openings 96 pass into a common collection chamber. FIG. 6 shows a collection chamber 104 in communication with orifice openings 96. In addition, collection chamber 104 also communicates with the outlet ports 100 that deliver disengaged gas from bed 88 to nozzle 102.

Figure 7:
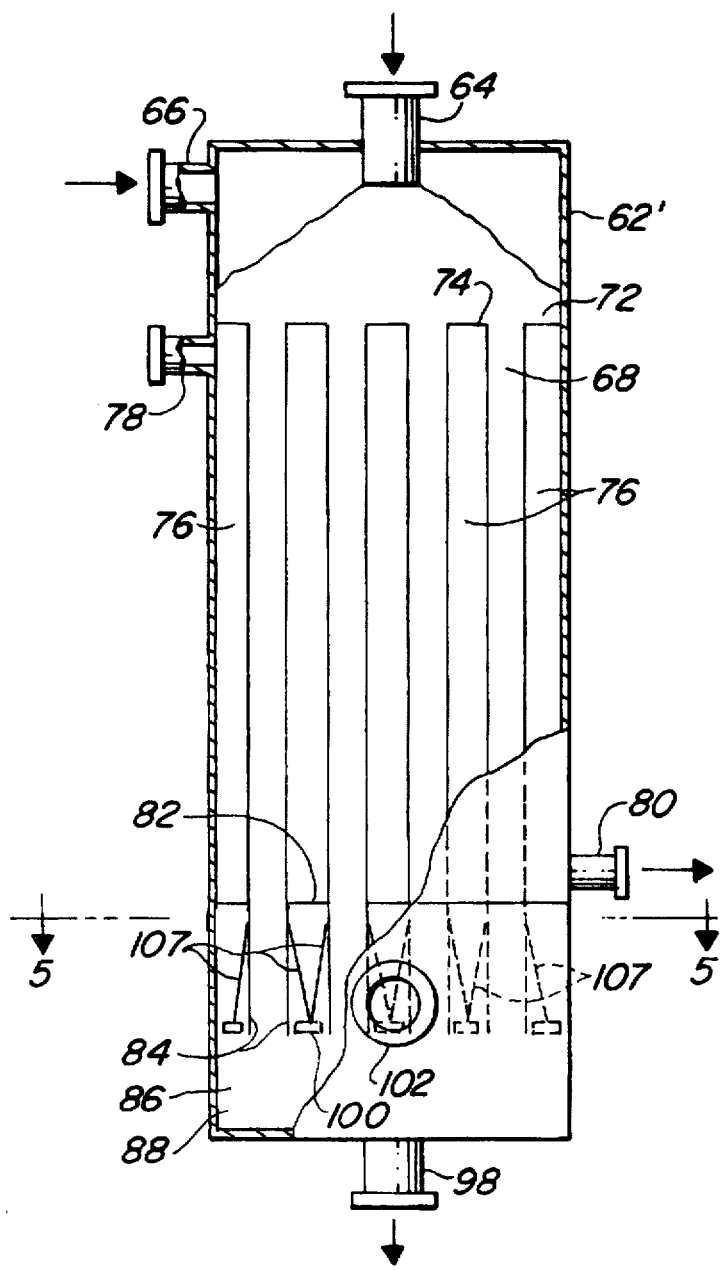
FIG. 7 is an modified version of the channel and vessel arrangement shown in FIG. 5.

FIG. 7 depicts a modified form of the vessel of FIG. 5. Vessel 62' is the same as vessel 62 of FIG. 5 except for the replacement of collection chambers 90, 92, and 94 with sloped baffles 107. Each sloped baffle forms a tapered gas flow channel between itself and the adjacent perforated plate 84. The sloped baffle more severely restricts gas flow at the top of the perforated plates where pinning is more likely to occur. A larger space between the baffle 107 and perforated plate 84 is provided at the bottom of the perforated plate 84 where exiting gas has a longer flow path through the particles retained in the channels that serves to reduce gas flow relative to the upper portion of the plate 84.

What is claimed is:

1. An apparatus for contacting a fluid stream with particulate solids and disengaging the fluid stream from the particles, said apparatus comprising:

a partition at least partially defining a flow channel adapted to retain particulate solids;

a flow channel inlet defined at least in part by said partition at an upper end of said flow channel for receiving a fluid flow;

a flow channel outlet defined at least in part by said partition at a lower end of said flow channel;

a disengagement chamber defined at least in part by a vertically extended and fluid permeable sidewall and in communication with said flow channel outlet for receiving particulate material and said flow of fluid; and, a flow restrictor arranged to restrict the flow of fluid out of an upper portion of said sidewall relative to a lower portion of said sidewall.

2. The apparatus of claim 1 wherein said fluid permeable sidewall comprises a perforated plate.

3. The apparatus of claim 1 wherein said flow restrictor comprises a restriction chamber containing particulate material and defining a longer flow path through the particulate material in the restriction chamber for fluid exiting an upper portion of said sidewall relative to gas exiting a lower portion of said sidewall.

4. The apparatus of claim 1 wherein said partitions comprise tubes and said flow channels have a circular cross-section.

5. The apparatus of claim 1 wherein said partitions comprise plate members and define vertically extended flow channels.

6. An apparatus for contacting a fluid stream with particulate solids, said apparatus comprising:

a first plurality of partitions defining a plurality of flow channels, a flow channel inlet at an upper end of each of said flow channels, and a flow channel outlet at a lower end of each of said flow channels;

a second plurality of partitions defining a plurality of vertically extended disengagement channels, a plurality of disengagement channel inlets in communication with said flow channel outlets, and a plurality of disengaging channel outlets for discharging particulate material, said second plurality of partitions having fluid permeable sidewalls for discharging fluid laterally from said channels; and, a fluid flow regulator in closed communication with said fluid permeable side walls for restricting fluid flow across said side walls to a velocity that is less than the velocity that will cause particulate material to pin along the sidewalls.

7. The apparatus of claim 6 wherein said partitions comprise tubes and said flow channels have a circular cross-section.

8. The apparatus of claim 7 wherein said partitions comprise plate members and define vertically extended flow channels.

9. The apparatus of claim 6 wherein said flow regulator comprises at least one baffle defining a first regulation chamber that communicates with a first portion of said fluid permeable side wall and a second regulation chamber that communicates with a second portion of said sidewall located below said first portion of said sidewall.

10. The apparatus of claim 9 wherein said first chamber and said second chamber each define a restricted opening for discharging fluid received from the disengaging channels and the open area of the restricted openings is less that the open area of the fluid permeable side bounded by said chambers.

11. The apparatus of claim 6 wherein said flow regulator comprises a diverging baffle located proximate said gas permeable side wall that defines a fluid flow passage having a progressively larger flow area down the length of the gas permeable sidewall.

12. The apparatus of claim 6 wherein said flow regulator comprises a packed bed of particulate material positioned against said gas permeable sidewall by a particle retainer and said particle retainer is substantially closed to fluid flow at its upper end and substantially open to fluid flow at its lower end.

13. A method of separating fluids from particulate solids in a process for contacting said fluid stream with particulate solids, said method comprising:

retaining particulate solids in a vertical flow channel and at least periodically withdrawing particulate material from a first particle outlet of said flow channel;

passing a process fluid through said flow channel and discharging process fluid from said first particle outlet;

discharging process fluid and particulate material from said outlet to a disengaging channel and at least periodically discharging particulate material from a second particle outlet;

discharging at least a portion of said process fluid from a fluid permeable portion of said disengaging channel upstream of said second particle outlet;

restricting the flow of process fluid out of said fluid permeable portion to maintain a velocity through said screens that is less than the velocity that will cause the pinning of particulate solids against the fluid permeable portion; and, recovering process fluid.

14. The process of claim 13 wherein said process fluid and particulate solids are indirectly heat exchanged with a heat exchange fluid.

15. The process of claim 13 wherein said process fluid comprises a reactant mixture and said particulate solids comprise a catalyst.

16. The process of claim 13 wherein said process fluid comprises a gas.

17. The process of claim 13 wherein distinct portions of the process fluid discharged through the fluid permeable portion of the disengaging channel enter at least two different chambers and the flow of process fluid from the different chambers is restricted.

18. The process of claim 13 wherein the process fluid discharged from said fluid permeable portion of the disengaging channel contacts a baffle that restricts fluid flowing from the top of the fluid permeable portion more than fluid flowing from the bottom of the fluid permeable portion.

19. The process of claim 13 wherein the process fluid is discharged from the fluid permeable portion of the disengaging channel into a layer of catalyst and substantially all of the process fluid entering the layer of catalyst is discharged from the bottom of the catalyst layer.

* * * * *